Sept. 23, 1958     P. S. BALDWIN     2,852,919

BRAKE WEAR COMPENSATING DEVICE

Filed July 27, 1955

INVENTOR:
Philip S. Baldwin

United States Patent Office 2,852,919
Patented Sept. 23, 1958

2,852,919

BRAKE WEAR COMPENSATING DEVICE

Philip Sidney Baldwin, Florence, Italy, assignor of one-half to Fiat Società per Azioni, Turin, Italy Application July 27, 1955, Serial No. 524,684

Claims priority, application Italy August 2, 1954

10 Claims. (Cl. 60—54.5)

This invention relates to a device for use in connection with motor vehicle hydraulic brake circuits for taking up the play arising between the brake shoes and brake drums due to wear of the brake shoe linings.

An object of the present invention is to provide an improved device which automatically maintains the said play constant until the brake shoe linings are worn out.

It is also an object of the present invention to provide a device of the type set forth which prevents the wear of the brake shoe linings caused by thermic expansion of the brake fluid in the wheel brake cylinders and in the conduits leading thereto when the apparatus is in use.

It is a further object of the invention to provide a device of simple structure and low cost which does not require frequent maintenance and can operate without mechanical or hydraulic failure for relatively long periods of time.

Further advantages and characteristic features of this invention will be understood from the following specification referring to the accompanying drawings, wherein.

Figure 1:
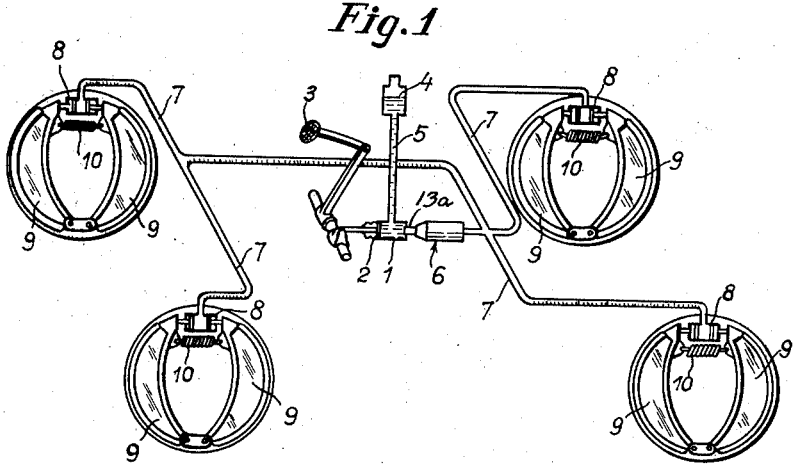
Figure 1 shows diagrammatically the hydraulic braking circuit of a motor vehicle provided with the mechanism according to this invention.

Referring to the drawings in which the same reference numerals denote corresponding parts in the various embodiments, more particularly in Figure 1, 1 denotes the master cylinder of the motor vehicle braking circuit, comprising a piston 2 actuated by the brake pedal 3. An expansion reservoir 4 is connected to the top of the said master cylinder by a conduit 5 to supply hydraulic fluid to the master cylinder and to take up changes in the volume of the fluid in the system. The mechanism according to this invention is connected between the master cylinder and the wheel cylinders, the said mechanism being generally denoted by 6 and supplying brake fluid to the wheel brake cylinders 8 through piping 7. Pistons move in said wheel cylinders and are connected to one end of the shoes 9 which are hinged at their other end and connected together by the return springs 10.

Figure 2:
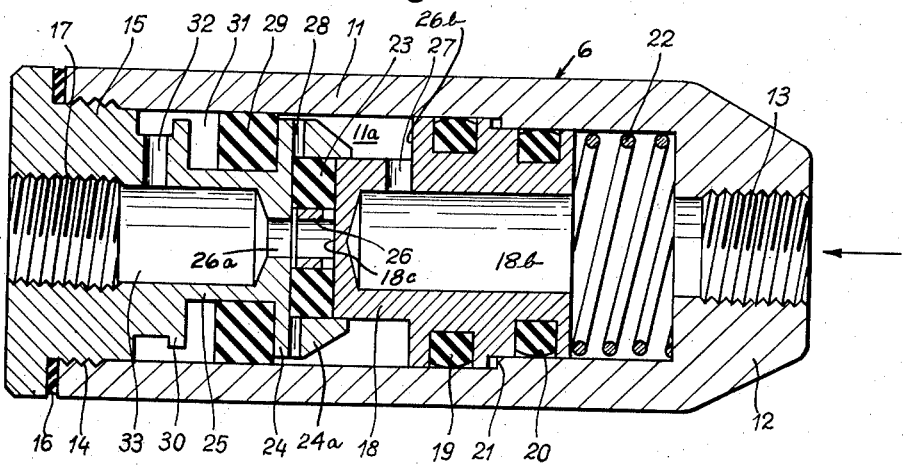
Figure 2 shows an embodiment of the mechanism according to this invention.

Referring now to the first embodiment shown in section in Figure 2, this comprises a two-diameter compound cylinder 11 having an end 12 formed with a screw-threaded opening 13 serving for connection with the supply pipe 13a extending from the master cylinder. The other cylinder end is screw-threaded at 14 and has screwed thereinto a plug 15; the cylinder is sealed at the joint with the plug by a packing 16.

The plug 15 is formed with a screw-threaded hole 17 for connection with the supply conduits 7 for the wheel brake cylinders. A compound three-diameter piston 18 moves in the cylinder. The surfaces of the piston part of largest and middle diameter and the surface of the associated two-diameter cylinder are sealed by means of packings 19, 20. The stroke to the right (of the figure) of the compound piston is limited by an abutment 21 provided in the cylinder 11 at the connection of the two parts of the compound cylinder. On its stroke in the opposite direction under pressure of spring 22 the compound piston comes into contact with the valve member 23 which abuts the flange 24 carried by a tubular section 25 integral with the plug 15.

The compound piston is hollow and is closed at its smallest diameter end. A tube section 26 is arranged on the closed end and carries the packing or valve 23.

Radial ports 27 are provided in the compound piston, a bored projection 24a is provided on the flange 24 for guiding the compound piston and valve or packing 23, this projection being integral with the flange 24. The valve or packing 23 and the end 18c of the compound piston 18 are adapted to slide in the said bored projection. Radial ports 28 are provided in the projection 24a to connect the chamber 11a with the fluid passageway 26a.

A floating member 29 is displaceable on the tubular section 25 between the flange 24, and an abutment 30 provided on the side of the said tubular section remote from the flange 24. The chamber 31 between the abutment 25 and the floating member 29 is connected by radial passage 32 with an inner bore 33 in the plug 15 communicating with the screw-threaded hole 17 in the said plug.

The mechanism operates in the following manner. Under pressure from the brake pedal, the fluid enters from the master cylinder through holes 13, 27, flows through chamber 11a and acts on the floating member 29, which is axially displaced against the abutment 30. Under the effect of this movement the fluid in the annular chamber 31 is displaced towards the wheel brake cylinders through holes 32, and outlet hole 17. The bore of the cylinder, the outer diameter of the tubular section, and the stroke of the floating member 29 are correlated so that the volume of liquid forced towards the brake wheel cylinders by effect of the above described displacement is exactly the quantity required for moving the brake shoes towards the brake drums for the idle approach stroke.

Consequently, by reason of the contact of the brake shoes against the drums greater pressure from the master cylinder is required to set the brakes and as the greater pressure is applied, the compound piston 18 is moved to the right (on the drawing) against the reaction of spring 22 until the piston seats against its abutment 21, moving valve 23 away from ports 28 thereby directly connecting the fluid inlet chamber 186 with the chamber 33 through the ports 28. This transfers pressure fluid from the master cylinder to the wheel cylinder circuits. The valve 23 does not open however, until the floating ring 29 has moved against its left-hand abutment in figure in order to bring the brake shoes into contact with the drums.

As the delivery pressure from the master cylinder ceases, the compound piston 18 is forced by the spring 22 to the left until the valve or packing 23 is again pressed against the flange 24, closing the ports 28. This breaks connection between the chambers 186 and 33 and the floating member 29 is again moved towards its right-hand abutment by backflow of the fluid under the pressure created by the load of the brake shoe return springs.

The brake shoes abut therefore against the pistons of the wheel brake cylinders in which is retained the residual pressure of the fluid trapped in the chamber 33 and the conduits leading to the wheel cylinders. The greater the wear of the linings the greater is the quantity of fluid in the secondary circuit and the greater the pressure therein and the load applied to the shoes by the return springs 10, and the greater is therefore the residual pressure referred to.

As this pressure reaches a given value, it acts on the central piston area 18c and overcomes the axial pressure of the reaction spring 22 of the valve, the valve opening to relieve excess pressure.

As mentioned above, the taking up of the wear of the brake shoe linings is effected through axial displacement of the floating ring 29, independently of the value of the residual pressure, up to the predetermined limit at which the valve 23 opens for discharging fluid.

The special advantage of this double-control valve mechanism resides in the fact that, the chamber 18b being positively connected with the chamber 33 every time the brakes are actuated, any thermal expansion of the fluid in the chamber 33 due to heat generated by the brakes is absorbed into the chamber 18b, thereby avoiding any jamming of the brakes, the valve merely operated by the residual pressure being insufficient to insure in every case loosening of the brakes under the said thermal conditions. Thus, thermal expansion also acts on the area 18c to vent the brake wheel cylinders.

Changes in the design, construction and arrangement of parts may be made without departing from the spirit of the invention as defined by the appended claims.

What I claim is:

1. A brake shoe wear-compensating device for use in connection with the brake wheel cylinders of an hydraulic brake system comprising, a cylinder having an inlet port for connection with a master cylinder, an outlet port for connection with a wheel cylinder, a first piston movable in said cylinder adjacent said inlet port, an inlet chamber at said inlet port, a passage in the piston communicating with said inlet chamber, an outlet chamber adjacent said outlet port, and means between said chambers for establishing communication between the two, a valve carried by said piston and normally biased to close communication between said chambers, means in said cylinder defining a third chamber in said cylinder, said third chamber communicating with said outlet port, said last named means forming a seat for said valve, a floating piston movable in said third chamber, said floating piston having a face in constant communication with said inlet chamber and having an opposite face in constant communication with said outlet chamber, said floating piston being movable to displace the fluid in its chamber to said outlet chamber upon the application of pressure in said inlet chamber to move the brake shoes against the brake drums of the system, said first piston having a face positioned to receive the pressure from the inlet source after the brake shoes have been set, the application of said inlet pressure acting on said latter face to move said piston and open said valve, thereby establishing communication between said inlet and outlet chambers and equalizing any imbalance which may exist between the two.

2. A device according to claim 1 in which said first piston has an additional face subject to pressure from the outlet chamber, a rise of pressure in said outlet chamber, sufficient to overcome the force of said valve biasing means, acting on said piston to open said valve, and permit fluid flow between the inlet and outlet chambers to correct any imbalance due to thermal expansion of fluid.

3. A device according to claim 1, in which said third chamber is of a size to hold a predetermined quantity of fluid to be expelled to said outlet chamber.

4. A device according to claim 1, in which said second named means in said cylinder comprises a fixed concentric tubular member, said third chamber being formed in said tubular member, said floating piston comprising a ring slidable thereon, and means for limiting the traverse of said floating piston in each direction.

5. A device according to claim 1, in which said second named means in said cylinder comprises a fixed concentric tubular member at one end, said third chamber being formed in said tubular member, said floating piston comprising a ring slidable thereon, and means for limiting the traverse of said floating piston in each direction; said first piston comprising a support for said valve, said tubular member having a face comprising a seat for said valve.

6. A device according to claim 1, in which said first piston comprises a reduced extension and a passage therethrough to establish communication between said inlet chamber and said floating piston, a shoulder on said piston adjacent said extension, said shoulder receiving the inlet fluid pressure to open said valve after the brakes have been set.

7. A device according to claim 1, in which said valve comprises an assembly carried by an end face of said first piston, said assembly comprising a reduced extension of said piston, said valve comprising a resilient ring supported on said extension.

8. A device according to claim 1, in which said second named means in said cylinder is a fixed concentric tubular member seated therein at one end, said tubular member comprising a support for said floating piston, and said valve comprises an assembly carried by an end face of said first piston, the end face of said tubular member and the end face of said first piston being in juxtaposition, said valve seating against the end face of said tubular member.

9. A device according to claim 1, in which said second named means in said cylinder is a fixed concentric tubular member seated therein at one end, said tubular member comprising: said outlet chamber, a support for said floating piston, an enlarged flange at one end having a bore to receive said first piston, said valve being seated against the base of said flange when closed, said flange having ports adjacent said base to establish communication between said inlet and outlet chambers when the valve is open.

10. A brake shoe wear-compensating device for use in connection with the brake wheel cylinders of an hydraulic brake comprising, a cylinder having an inlet port for connection with a master cylinder, an outlet port for connection with a wheel cylinder, a compound piston movable in said cylinder adjacent said inlet port, an inlet chamber at said inlet port, an outlet chamber adjacent said outlet port, and means between said chambers for establishing communication between the two, a valve carried by said compound piston and normally biased to close communication between said chambers, a third chamber in said cylinder having an inner and an outer longitudinal wall, and communicating with said outlet and inlet port, a floating ring movable in said third chamber having sealing contact with the outer and inner longitudinal walls of the chamber, said floating ring being movable to displace the fluid in its chamber to said outlet chamber upon application of pressure in said inlet chamber to move the brake shoes against the brake drums of the system, said compound piston being positioned to receive the pressure from the inlet port and to be moved by said pressure to open said valve, thereby establishing communication between said inlet and outlet chambers and equalizing any undue difference in pressure which may exist between the two.

References Cited in the file of this patent

UNITED STATES PATENTS

| | | |
|---|---|---|
| 2,385,625 | Hopmans | Sept. 25, 1945 |
| 2,603,951 | Ross | July 22, 1952 |